United States Patent [19]
Robertson et al.

[11] 4,192,841
[45] Mar. 11, 1980

[54] PROCESS FOR MAKING DUSTLESS, READILY-DISPENSIBLE PIGMENT GRANULES

[75] Inventors: George H. Robertson, Cincinnati, Ohio; Robert L. Rooney, Beith; Robert B. Todd, Paisley, both of Scotland

[73] Assignee: Ciba-Geigy Corporation, Ardsley, N.Y.

[21] Appl. No.: 889,680

[22] Filed: Mar. 24, 1978

[30] Foreign Application Priority Data

Nov. 18, 1977 [GB] United Kingdom ............... 48062/77

[51] Int. Cl.$^2$ .......................... C09B 67/00; C09C 1/58
[52] U.S. Cl. ....................... 264/117; 106/22; 106/26; 106/32; 106/288 Q; 106/308 C; 106/308 N; 106/309
[58] Field of Search ........... 106/308 C, 308 N, 288 Q; 264/117

[56] References Cited

U.S. PATENT DOCUMENTS

| 2,822,337 | 2/1958 | Evans | 252/465 |
| 4,001,035 | 1/1977 | Ito et al. | 106/308 M |
| 4,015,999 | 4/1977 | Robertson et al. | 106/288 Q |
| 4,036,652 | 7/1977 | Rothmayer | 106/308 N |
| 4,055,439 | 10/1977 | Bäbler | 106/288 Q |

OTHER PUBLICATIONS

Kirk–Othmer, Encyclopedia of Chem. Tech., vol. 2 (1964), pp. 416, 418–419, 600; Suppl. vol., (1972), pp. 888–889, 896.

Primary Examiner—Helen M. McCarthy
Attorney, Agent, or Firm—Joseph F. Di Prima

[57] ABSTRACT

A process for producing a pigment or dyestuff composition in the form of dustless readily-dispersible granules which comprises contacting, with agitation, an aqueous dispersion of a pigment, and an aniline which is liquid at temperature below 100° C., insoluble in water at pH values above 7, and soluble in water at pH values below 7, the pH value being first above 7, maintaining the temperature above the melting point of the aniline and reducing the pH to below 7 to render the aniline compound soluble in water, and recovering the resulting granules in a solvent free condition.

10 Claims, No Drawings

PROCESS FOR MAKING DUSTLESS, READILY-DISPENSIBLE PIGMENT GRANULES

The present invention relates to a process for the preparation of dustless, readily-dispersible pigment or dyestuff granules.

The preparation of pigment granules by a process which comprises stirring together an aqueous pigment dispersion and a solution of a water-insoluble organic carrier in a water-immiscible organic liquid is known. However, in the known processes the resulting product contains some solvent, and it is necessary to remove the organic solvent from the product by distillation. We have now discovered a process in which the product is obtained directly in a solvent free condition.

According to the present invention there is provided a process for producing a pigment or dyestuff composition in the form of dustless readily-dispersible granules which process comprises contacting with agitation, an aqueous dispersion of a pigment, and an amine which is liquid at temperatures below 100° C., insoluble in water at certain pH values, and soluble in water at certain lower pH values, the pH value being at or above that at which the amine compound is insoluble in water, maintaining the temperature above the melting point of the amine compound and reducing the pH to below 7, to render the amine compound soluble in water and recovering the resulting granules.

The amine may be an aromatic or substituted aromatic compound for example, aniline, N-methyl aniline, N-ethyl aniline, N-propyl aniline, N-butyl aniline, N,N-dimethyl aniline or N,N-diethyl aniline, N,N-dipropylaniline, N-cyclohexyl aniline, N-cyclohexyl N-hydroxyethyl aniline, N-octyl aniline, N-methyl-o-toluidine, N-ethyl-p-toluidine, N-butyl-m-toluidine, N,N-diethyl-m-toluidine, N,N-dimethyl-m-toluidine, methyl anthranilate, but is preferably N,N-diethyl aniline.

Usually the amount of amine compound used is from 0.1 to 2 parts, preferably 0.3 to 0.6 parts by weight per part of pigment.

The pigments and dyestuffs that can be used are those which are water insoluble and stable in the pH range required for granule formation and isolation. Suitable pigments are azo, azomethine, anthraquinone, phthalocyanine, nitro, perinone, perylene, dioxazine, thioindigo, isoindolinone, quinacridone, azo or azomethine metal salts or complexes; mixtures of pigments may also be used. Water insoluble dyestuffs are those such as the solvent soluble azo and phthalocyanine dyes. These dyes can also be used as mixtures and in admixture with the pigment.

Preferably a protective colloid is added to the mixture to assist in the formation of granules and the production of granules of a more uniform size distribution. When used it is preferably mixed with an aqueous pigment slurry or an aqueous dispersion of the amine compound before the pigment and amine compound are brought together. Suitable protective colloids include cellulose derivatives such as hydroxy ethyl cellulose, hydroxy propyl cellulose, polyvinyl alcohol, polyethylene oxide, polypropylene oxide, copolymers of ethylene oxide and propylene oxide, adducts of ethylene oxide or propylene oxide, polyvinyl pyrrolidone and its copolymers or mixtures of these compounds. The preferred compounds are those of the hydroxy ethyl cellulose type as exemplified by the Natrosol range of the Hercules Powder Company. The amount of protective colloid may be up to 15 percent, but is preferably less than 5 percent by weight of the pigment.

The mixture is originally formulated at or adjusted to a pH of at least that at which the amine compound is insoluble in water. The mixture is stirred at least until the pigment has migrated from the aqueous phase to the organic phase. Sufficient stirring is used to keep the droplets (or granules) in suspension. The size of granule is controlled to some extent by the speed of stirring. Increased stirring or turbulence gives a reduction in granule size. The granules may be from 0.1 to 5 mm in diameter, but preferably from 0.5 to 2 mm in diameter.

The time of the process can be varied depending on the pigment used and the desired properties of the product. For example some pigments, particularly azo pigments, are susceptible to crystal growth when maintained in contact with the aniline compound, the amount of growth being dependent on the time of contact and the temperature. Increased crystal size gives a pigment having higher opacity. Therefore, in these cases and if a product with good opacity and improved rheology in the application system is required, the time of contact of the pigment with the amine compound can be increased. If, on the other hand, a pigment of this type is used but a product having good transparency is required, the process time can be shortened to that which is sufficient for the pigment to migrate into the organic phase. In these cases the addition of a carrier assists robust granule formation, thereby further shortening the process time. Selection of amine can also affect the opacity/transparency: aliphatic amines have less crystallising effect than aromatic amines and thus produce more transparent compositions.

With those pigments which show little or no tendency to crystal growth in the process, there is no benefit from increased time of contact of the pigment with the amine compound beyond that required to form granules. In these cases granule formation is further assisted by the use of inorganic salts dissolved in the water during the contacting process. Especially typical of such pigments are those which have been treated with a crystallising solvent during a previous process stage, e.g. halogenated copper phthalocyanine (green).

The pH of the mixture is then reduced to below that at which the amine compound becomes completely soluble in water. This is usually below 7, preferably 5, by the addition of an acid which will form a water-soluble salt with the amine compound. The preferred acids are hydrochloric acid and acetic acid. This causes the amine compound to dissolve in the water as a salt, leaving the organic carrier if used, and pigment granules in suspension. If necessary, e.g. to promote solution, or if desired for handling or product performance, the temperature of the mixture may be increased or decreased. The granules are then recovered by sieving, washing and drying. Any granules that are too small to be recovered in this way may be filtered off and re-used in a subsequent batch.

To recover the solvent, the pH of the filtrate is raised, usually to a pH above 7, e.g. 10, whereupon the solvent becomes insoluble, separates from the water and can be recovered for subsequent use by decantation for example. The aniline derivative may be further purified, if necessary, by steam distillation.

It is also possible to combine the granulation process of the present invention with a pigment solvent treatment process, to improve those pigment properties known to be improved by a solvent treatment. The solvent treatment can be carried out before or during the granulation step. For example, a phthalocyanine in a highly aggregated state of an α/β crystal form mixture, as produced by dry grinding may be de-aggregated and converted substantially to the β-form using the amine compound as the solvent in a solvent treatment process.

The granules, especially those of <1 millimeter diameter can be improved in free flowing nature initially and during storage by the addition of a small percentage for instance up to 2% by weight, of a finely divided inorganic or modified inorganic material conventionally used for imparting such properties, such as a finely divided silica or silicate; such materials may conveniently be added to the granules by simple mixing. Especially advantageous materials of this type are the finely divided silicas with surface modifications by organic groups such as the Aerosil R 972 ex. Degussa.

The products of the invention may be used for the pigmentation of any system, such as surface coating media, e.g. paint and ink, or plastics. The carrier used will normally be selected so as to be compatible with the system to be pigmented. The product, when incorporated into the system, releases the pigment from the granule to colour the material.

The invention is illustrated by the following Examples, wherein parts are parts by weight.

EXAMPLE 1

20 Parts of C.I. Pigment Green 7 in the form of a 30%w/w presscake were dispersed into 600 parts of water in which there was dissolved 30 parts sodium acetate and 10 parts sodium chloride. After raising the temperature to 85° C. 10 parts of NN-diethyl aniline were added and stirring continued for 2 hours at 85° C. The pH was then reduced to just below 1 by the addition of 5 N hydrochloric acid. 20 Parts of granules were removed on a 60 B.S. mesh sieve and after carefully washing to eliminate inorganic salts and acids, the product was dried at 55° C. The resultant non-dusting granules could be dispersed into lithographic ink media.

EXAMPLES 2-7

A series of bisarylamide azo pigments were prepared according to conventional azo coupling techniques. To 20 parts of the various pigments as 5%w/w aqueous suspensions, as shown in the table, were added 0.2 parts hydroxyethyl cellulose (Natrosol 250 HR) and, after adjusting to pH 10 with 2 N sodium hydroxide, 10 parts of NN-diethylaniline. In each case the temperature was raised 85° C. and stirring continued at this temperature for 2 hours; the pH was then adjusted to just below 1 by the addition of 5 N hydrochloric acid and the granular product isolated by washing free of inorganic salts and acids followed by drying at 60° C. The resulting products dispersed into lithographic oil ink media.

| Example | Pigment |
| --- | --- |
| 2 | C.I. Pigment Yellow 13 |
| 3 | C.I. Pigment Yellow 12 |
| 4 | C.I. Pigment Yellow 14 |
| 5 | C.I. Pigment Yellow 17 |
| 6 | C.I. Pigment Yellow 55 |
| 7 | C.I. Pigment Yellow 63 |

EXAMPLE 8

20 Parts of C.I. Pigment Yellow 13, as a 5% w/w aqueous slurry prepared in a conventional aqueous azo coupling and 0.2 part hydroxyethyl cellulose (Natrosol 250 HR) are heated to 85° C. at pH 6. 10 parts of NN-diethyl aniline were then added and stirring continued for a further 30 minutes. The pH was adjusted to just below 1 with 5N-hydrochloric acid and the granular product isolated by filtration, washing free of inorganic salts and acids and drying at 55° C. The properties of this product were similar to those of Example 2.

EXAMPLE 9

30 Parts of an aqueous slurry of C.I. Pigment Yellow 83 and 0.3 parts of hydroxyethyl cellulose (Natrosol 250 MR) were adjusted to pH 7 and heated to 85° C. 30 Parts of NN-diethyl aniline were added with stirring and contacting continued for 3 hours at 85° C. pH was then adjusted to just below 1 by addition of 5 N hydrochloric acid and the generally spherical granules isolated by filtration on a 60 B.S. mesh sieve, washed free of inorganic salts and acid and dried at 60° C. The dry granules were free-flowing and robust to applied pressure. Incorporation into a lithographic ink gave a film slightly more opaque than the product of Example 16; a nitrocellulose binder—alcohol solvent ink again exhibited good rheology and a final film of excellent gloss.

EXAMPLE 10

A mixture of 30 parts of an aqueous slurry of C.I. Pigment Yellow 83 and 0.2 parts of hydroxyethyl cellulose (Natrosol 250 HR) was adjusted to pH 11 and 15 parts NN-diethylaniline added. The temperature was raised to 95° C. and maintained at this temperature with constant stirring for 6 hours. The pH was then reduced to 0.5 by the addition of 5 N hydrochloric acid. The product was then recovered by filtration on a 60 B.S. mesh sieve, washed free of inorganic salts and acid and dried at 55° C. The resultant product was generally spherical granule of 0.5–1 mm average diameter.

EXAMPLE 11

The procedure of Example 10 was repeated with an identical formulation and stirring conditions but omitting the hydroxyethyl cellulose: the resulting product was granules of 3–5 mm diameter.

EXAMPLE 12

15 Parts of C.I. Pigment Red 38 in the form of a 5% w/w aqueous slurry, obtained by a conventional aqueous coupling, was added to 400 parts water and the pH raised to 6.3.; 0.2 parts hydroxyethyl cellulose was added and heating commenced. When a temperature of 70° C. was reached, 15 parts N,N-diethylaniline were added and the temperature was raised to 80° C. After stirring at 80° C. for a further 3 hours, the pH was lowered to just below 1.0 by the addition of 10 N hydrochloric acid and the product separated and dried as in Example 10. The resulting spherical granules could be readily dispersed in lithographic ink medium.

EXAMPLE 13

24 Parts of C.I. Pigment Orange 34 in the form of a 5% w/w aqueous slurry, obtained by a conventional acetate buffered aqueous coupling was dispersed with 100 parts water and the pH raised to 7.0 by the addition of 2 N potassium hydroxide solution. 12 parts N,N-diethylaniline were added and the temperature raised to 80° C. over 45 minutes. After stirring at 80° C. for a further 15 minutes, the pH was lowered to just below 1.0 by the addition of 10 N hydrochloric acid. The resulting granules were separated by filtration and washed chloride free and dried as in Example 10. The granules of 0.5–4 mm diameter could be readily dispersed into lithographic ink medium.

EXAMPLE 14

120 Parts of C.I. Pigment Orange 34 in the form of a 5% w/w aqueous slurry, obtained by a conventional acetate buffered aqueous coupling was added to 500 parts water and the pH raised to 8.0 by the addition of 2 M sodium hydroxide solution; 0.6 parts hydroxyethyl cellulose was added and heating commenced. When a temperature of 60° C. was reached 120 parts, N,N-diethylaniline were added and the temperature raised to 80° C. After stirring at 80° C. for 2 hours the pH was lowered to just below 1.0 by the addition of of 10 N hydrochloric acid and the product separated and dried as in Example 10. The resulting spherical granules of 0.3–1 mm diameter could be readily dispersed into lithographic ink medium.

EXAMPLE 15

15 Parts of C.I. Pigment Red 3 in the form of a 5% w/w aqueous slurry, obtained by a conventional aqueous coupling, was dispersed with 400 parts water and the pH raised to 8.0 by the addition of 2 N sodium hydroxide. 0.3 Parts hydroxy ethyl cellulose was added and heating commenced. When a temperature of 80° C. was reached 10 parts N,N diethylaniline was added and the mixture stirred for a further 2 hours at 80° C. The pH was then reduced to 1.0 by the addition of 10 N hydrochloric acid and the product separated and dried as in Example 10. The resulting granules could be readily dispersed into lithographic ink medium.

EXAMPLES 16–22

The procedure of Example 8 was repeated except that the N,N'-diethyl aniline was replaced by an equal amount of the amines listed below. Product appearance and performance was equivalent to that of Example 8.

| Example | Amine |
|---------|-------|
| 16 | N,N'-dimethyl-3-methylaniline |
| 17 | N,N'-dipropyl-aniline |
| 18 | N-ethyl-2-methylaniline |
| 19 | N,N'-dibutylaniline |
| 20 | 2,5-dimethylaniline |
| 21 | methyl-anthranilate |
| 22 | aniline |

What is claimed is:

1. A process for producing an organic pigment or dyestuff composition in the form of dustless readily-dispersible granules which consists of contacting with agitation, an aqueous dispersion of a pigment and an aniline or a mono- or di-alkylaniline in which each alkyl group has 1 to 8 carbon atoms which is liquid at temperatures below 100° C., insoluble in water at pH values above 7, and soluble in water at pH values below 7, the pH being first above 7, maintaining the temperature above the melting point of the aniline, stirring at least until the pigment has migrated from the aqueous phase to the organic phase consisting of the aniline, and then reducing the pH to below 7 to render the aniline soluble in water, and recovering the resulting granules in a solvent-free condition.

2. A process as claimed in claim 1, in which the amount of aniline is from 0.1 to 2 parts by weight per part of pigment.

3. A process as claimed in claim 1, in which the amount of aniline is from 0.3 to 0.6 parts by weight per part of pigment.

4. A process for producing an organic pigment or dyestuff composition in the form of dustless readily-dispersible granules which consists of contacting with agitation, an aqueous dispersion of a pigment, a protective colloid, and an aniline or a mono- or di-alkylaniline in which each alkyl group has 1 to 8 carbon atoms which is liquid at temperatures below 100° C., insoluble in water at pH values above 7, and soluble in water at pH values below 7, the pH being first above 7, maintaining the temperature above the melting point of the aniline, stirring at least until the pigment has migrated from the aqueous phase to the organic phase consisting of the aniline and the protective colloid, and then reducing the pH below 7 to render the aniline soluble in water, and recovering the resulting granules in a solvent-free condition.

5. A process as claimed in claim 4, in which the protective colloid is mixed with an aqueous pigment slurry or an aqueous dispersion of the aniline before the pigment or dyestuff and aniline are brought together.

6. A process as claimed in claim 4, in which the protective colloid is a cellulose derivative.

7. A process as claimed in claim 4, in which the amount of protective colloid is up to 15% by weight of the pigment or dyestuff.

8. A process as claimed in claim 4, in which the amount of protective colloid is less than 5% by weight of the pigment.

9. A process as claimed in claims 1 or 4, in which the stirring is such as will produce granules of a size from 0.1 to 5 mm. in diameter.

10. A process as claimed in claims 1 or 4, in which the stirring is such as will produce granules of a size from 0.5 to 2 mm. in diameter.

* * * * *